US 6,707,643 B2

(12) United States Patent
Takeo et al.

(10) Patent No.: US 6,707,643 B2
(45) Date of Patent: Mar. 16, 2004

(54) PERPENDICULAR MAGNETIC RECORDING HEAD HAVING NARROW RECORDING GAP AND PERPENDICULAR MAGNETIC RECORDING APPARATUS USING THE SAME

(75) Inventors: Akihiko Takeo, Kunitachi (JP); Tetsuya Roppongi, Kawasaki (JP); Shinichi Horinouchi, Ichikawa (JP); Haruyuki Morita, Komoro (JP); Mikio Matsuzaki, Saitama (JP)

(73) Assignees: Kabushiki Kaisha Toshiba, Tokyo (JP); TDK Corporation, Tokyo (JP)

( * ) Notice: Subject to any disclaimer, the term of this patent is extended or adjusted under 35 U.S.C. 154(b) by 230 days.

(21) Appl. No.: 09/951,382

(22) Filed: Sep. 14, 2001

(65) Prior Publication Data

US 2002/0036863 A1 Mar. 28, 2002

(30) Foreign Application Priority Data

Sep. 25, 2000 (JP) ........................ 2000-291296

(51) Int. Cl.$^7$ .............................................. G11B 5/147
(52) U.S. Cl. .................................................... 360/125
(58) Field of Search ................................. 360/125–126

(56) References Cited

U.S. PATENT DOCUMENTS

| | | | |
|---|---|---|---|
| 4,631,612 A | | 12/1986 | Shiiki |
| 5,726,839 A | | 3/1998 | Shinohara |
| 5,966,348 A | * | 10/1999 | Hashimoto ............ 369/13.47 |
| 6,285,528 B1 | * | 9/2001 | Akiyama ................ 360/126 |
| 6,407,892 B2 | * | 6/2002 | Shiroishi ................ 360/126 |

FOREIGN PATENT DOCUMENTS

| | | |
|---|---|---|
| EP | 0290823 A2 | 11/1988 |
| EP | 0360978 A2 | 4/1990 |
| JP | 11-66503 | 3/1999 |

* cited by examiner

Primary Examiner—A. J. Heinz
(74) Attorney, Agent, or Firm—Finnegan, Henderson, Farabow, Garrett & Dunner L.L.P.

(57) ABSTRACT

A perpendicular magnetic recording apparatus includes a perpendicular double-layer film medium including a stack of a soft magnetic backing layer and a perpendicular magnetic recording layer in which recording is performed under a condition that a recording track pitch as a total of a recording track width and a guard-band width between recording tracks is set to be 1 μm or less, and a perpendicular magnetic recording head including a recording main pole, an auxiliary pole disposed at a gap having a length of five or less times the guard-band width with respect to the recording main pole, and an exciting coil.

15 Claims, 8 Drawing Sheets

PERPENDICULAR MAGNETIC RECORDING HEAD HAVING NARROW RECORDING GAP AND PERPENDICULAR MAGNETIC RECORDING APPARATUS USING THE SAME

CROSS-REFERENCE TO RELATED APPLICATIONS

This application is based upon and claims the benefit of priority from the prior Japanese Patent Application No. 2000-291296, filed Sep. 25, 2000, the entire contents of which are incorporated herein by reference.

BACKGROUND OF THE INVENTION

1. Field of the Invention

The present invention relates to a perpendicular magnetic recording head and a perpendicular magnetic recording apparatus.

2. Description of the Related Art

In a computer field, a magnetic disk apparatus has been much utilized as a randomly accessible external storage having a large capacity. With expanding utilization, for the magnetic disk apparatus, there has been an increasing demand for enhancement of a storage capacity and recording density.

As a method of enhancing the recording density of the magnetic disk apparatus, perpendicular magnetic recording has been proposed. In the perpendicular magnetic recording, as compared with longitudinal magnetic recording, a demagnetizing field in a magnetization transition can remarkably be reduced, a magnetization transition width can be narrowed, and high-density recording is realized. Moreover, in order to raise recording and reproducing efficiencies in the perpendicular magnetic recording, and form a steeper magnetization transition, a magnetic disk of a perpendicular double-layer film medium having a soft magnetic backing layer disposed under a perpendicular magnetic recording layer has been proposed.

A conventional perpendicular magnetic recording head having the following structure has heretofore been used for the perpendicular double-layer film medium formed by stacking the soft magnetic backing layer, having a thickness of 50 nm to several hundreds of nanometers, and the perpendicular magnetic recording layer. The structure includes a recording main pole (trailing pole), an auxiliary pole (leading pole) disposed as a return yoke at a gap from the recording main pole, and an exciting coil acting on these poles. In the perpendicular magnetic recording head, a magnetic field generated by the exciting coil is passed through the recording main pole, soft magnetic backing layer and auxiliary pole to form a closed magnetic path, a magnetic flux can be concentrated on the recording main pole, and recording efficiency can therefore be enhanced. In the conventional perpendicular magnetic recording head, in order to prevent a strong magnetic field from being generated under the auxiliary pole, an area of the air-bearing surface of the auxiliary pole is set to be larger than that of the main pole, and a gap between the main pole and the auxiliary pole is set to be as large as several micrometers.

However, in the conventional perpendicular magnetic recording head, under a high track density of a track pitch of 1 μm or less with enhancement of the recording density, the magnetic field generated under the auxiliary pole extends to adjacent tracks. As a result, it is seen that recorded magnetization in the adjacent track is disadvantageously disturbed by repeated recording in a certain track.

In Jap. Pat. Appln. KOKAI Publication No. 11-66503, it is described that the perpendicular magnetic recording head having a gap length between the recording main pole and the auxiliary pole in a range of 0.2 to 0.5 μm is used in recording with respect to the perpendicular double-layer film medium of the stack of the soft magnetic backing layer having a thickness of about 10 to 50 nm and the magnetic recording layer having perpendicular magnetic anisotropy. This publication aims at improvement in resolution of perpendicular magnetic recording and overwrite characteristics. However, in the publication, a low track density is presumed, influences onto the adjacent tracks is not considered, and therefore this publication cannot be applied to design a perpendicular magnetic recording head used under a high recording density.

BRIEF SUMMARY OF THE INVENTION

An object of the present invention is to provide a perpendicular magnetic recording head and perpendicular magnetic recording apparatus in which an adverse effect onto adjacent tracks can be inhibited during perpendicular magnetic recording with respect to a perpendicular double-layer medium.

According to one aspect of the prevent invention, there is provided a perpendicular magnetic recording head performing magnetic recording under a condition that a recording track pitch as a total of a recording track width and a guard-band width between the recording tracks is set to be 1 μm or less, the head comprising: a recording main pole; an auxiliary pole disposed at a gap from the recording main pole; and an exciting coil, a gap length between the recording main pole and the auxiliary pole being five or less times the guard-band width between the recording tracks.

According to another aspect of the present invention, there is provided a perpendicular magnetic recording apparatus comprising; a perpendicular double-layer film medium having a stacked structure of a soft magnetic backing layer and a perpendicular magnetic recording layer in which magnetic recording is performed under a condition that a recording track pitch as a total of a recording track width and a guard-band width between recording tracks is set to be 1 μm or less; and a perpendicular magnetic recording head comprising a recording main pole, an auxiliary pole disposed at a gap having a length of five or less times the guard-band width with respect to the recording main pole, and an exciting coil.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

Figure 1:
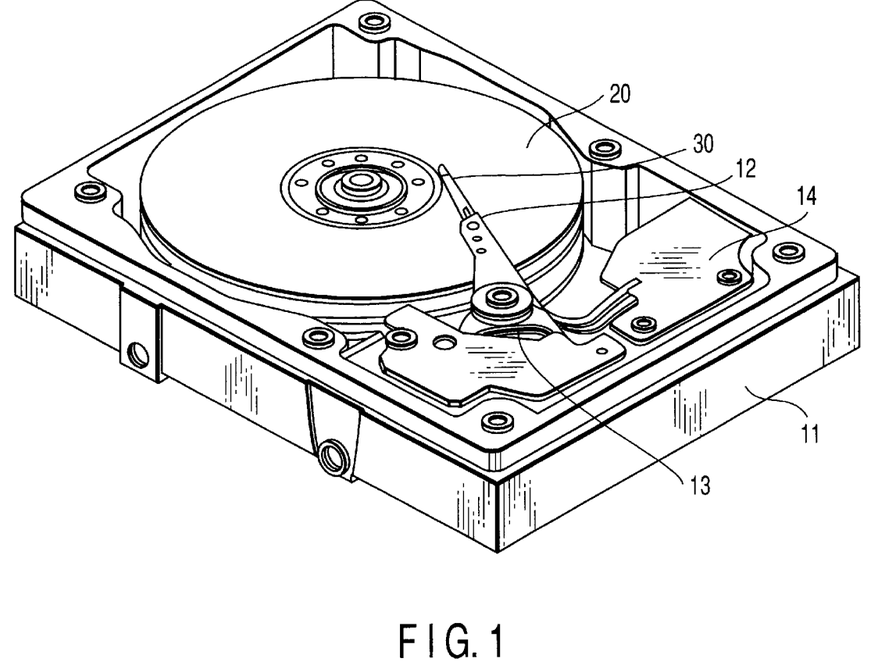
FIG. 1 is a perspective view showing a perpendicular magnetic recording apparatus according to one embodiment of the present invention.

FIG. 1 is a perspective view showing a perpendicular magnetic recording apparatus. The housing 11 contains the perpendicular magnetic recording medium 20 rotatably attached to a spindle motor. The suspension 12 is supported by the voice coil motor 13 so that it can pivot along the surface of the perpendicular magnetic recording medium 20, and the suspension 12 has the magnetic head 30 attached to a tip end thereof. The magnetic head 30 is connected to the head amplifier circuit 14.

Figure 2:
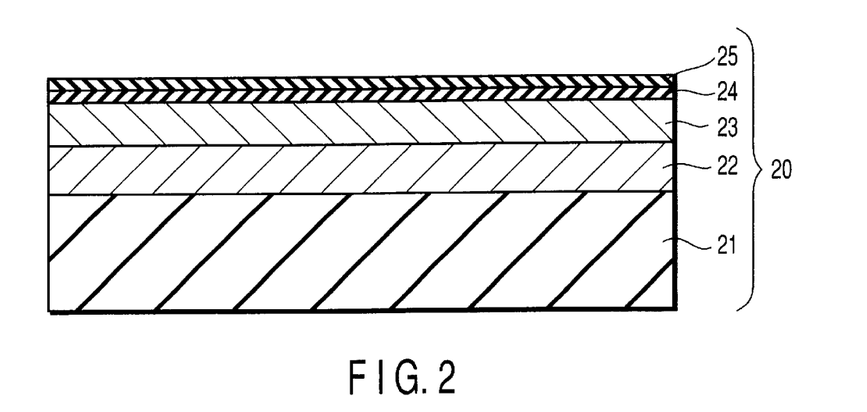
FIG. 2 is a sectional view of a perpendicular magnetic recording medium according to one embodiment of the present invention.

FIG. 2 is a sectional view of the perpendicular magnetic recording medium 20. On the substrate 21, the soft magnetic backing layer 22, perpendicular magnetic recording layer 23, protective layer 24, and lubricant layer 25 are successively formed. An underlayer may be disposed under the soft magnetic backing layer 22 or the perpendicular magnetic recording layer 23 for a purpose of controlling crystal orientation. Examples of a material for the substrate 21 include aluminum, reinforced glass, and the like. Examples of the material for the soft magnetic backing layer 22 include Permalloy (Fe-35 to 80% Ni), Sendust (9.6% Si-5.4% Al—Fe), CoCrNb, and the like. Examples of the material for the perpendicular magnetic recording layer 23 include a CoCr-based alloy, CoPt-based alloy, and the like. Examples of the material for the protective layer 24 include carbon, and the like.

Figure 3A:
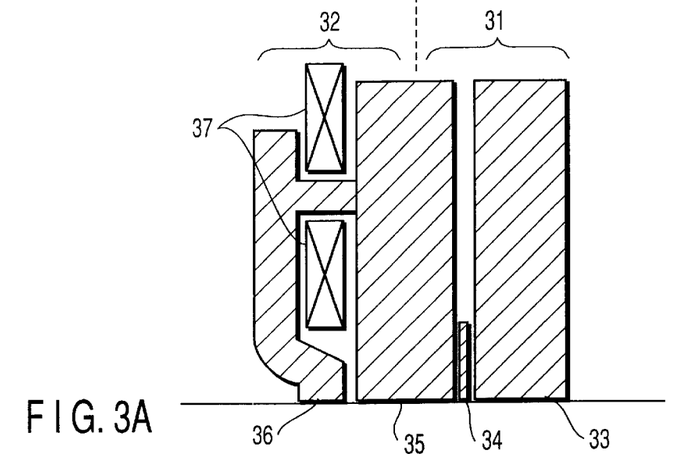
FIG. 3A is a sectional view of a perpendicular magnetic recording/reproducing head cut along a traveling direction according to one embodiment of the present invention.
Figure 3B:
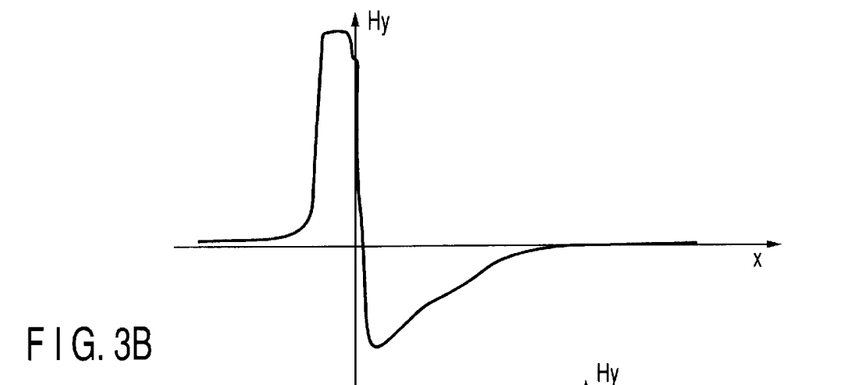
FIG. 3B is a diagram showing on-track recording magnetic field distribution generated by the magnetic head shown in FIG. 3A.
Figure 4A:
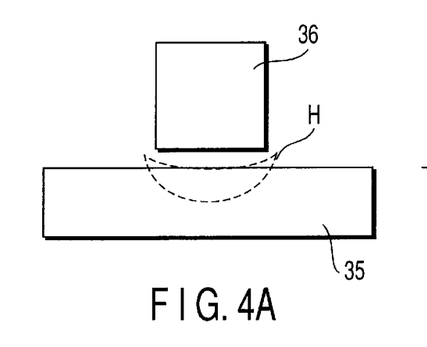
FIG. 4A is a plan view of the magnetic head as viewed from the air-bearing surface according to the embodiment of the present invention.
Figure 4B:
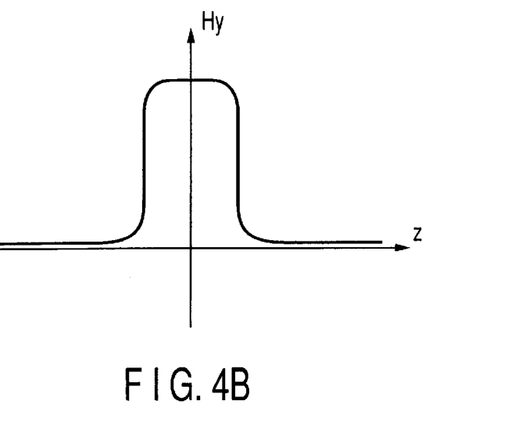
FIG. 4B is a diagram showing recording magnetic field distribution in a track width direction generated by the magnetic head shown in FIG. 4A.

FIG. 3A is a sectional view of a magnetic head cut along a traveling direction according to an embodiment of the present invention, and FIG. 3a shows on-track (x-direction) recording magnetic field distribution generated by the magnetic head. FIG. 4A is a plan view of the magnetic head as viewed from the air-bearing surface according to the embodiment of the present invention, and FIG. 4B shows recording magnetic field distribution in a track width direction (z-direction) generated by the magnetic head.

Figure 5A:
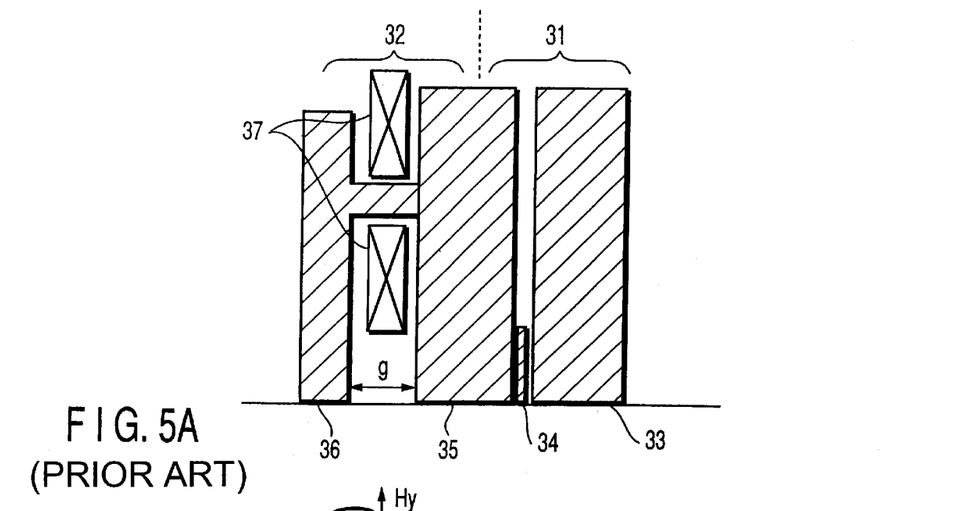
FIG. 5A is a sectional view of a conventional perpendicular magnetic recording/reproducing head cut along the traveling direction.
Figure 5B:
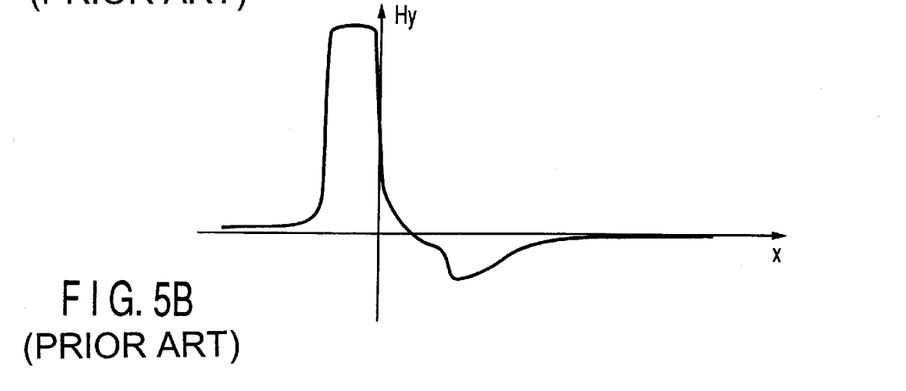
FIG. 5B is a diagram showing on-track recording magnetic field distribution generated by the magnetic head shown in FIG. 5A.

For comparison, FIG. 5A shows a sectional view of a conventional magnetic head cut along the traveling direction, and FIG. 5B shows on-track (x-direction) recording magnetic field distribution generated by the conventional magnetic head. Moreover, FIG. 6A is a plan view of the conventional magnetic head as viewed from the air-bearing surface, and FIG. 6B shows recording magnetic field distribution in the track width direction (z-direction) generated by the conventional magnetic head.

A structure of the magnetic head 30 according to an embodiment of the present invention will be described with reference to FIG. 3A. The magnetic head 30 has a merged structure of the reproducing section 31 and the recording section 32 in which the auxiliary pole 35 of the recording section 32 also functions as one of the shields of the reproducing section 31. More specifically, the lower shield 33, the reproduce element (e.g., GMR element) 34 buried in an insulating layer for defining a reproduction gap, and the upper shield also functioning as the auxiliary pole 35 of the recording section 32 form the reproducing section 31. Moreover, the auxiliary pole 35, the recording main pole 36 formed at a gap in the air-bearing surface and magnetically coupled to the auxiliary pole 35 in a position remote from the air-bearing surface, and the exciting coil 37 acting on the auxiliary pole 35 and recording main pole 36 form the recording section 32. The magnetic head has a recording main pole track width of about 0.6 µm, and the auxiliary pole 35 has a width of about 10 µm. Furthermore, a gap length between the recording main pole 36 and the auxiliary pole 35 in the air-bearing surface is set to be narrow, for example, 0.18 µm.

Figure 6A:
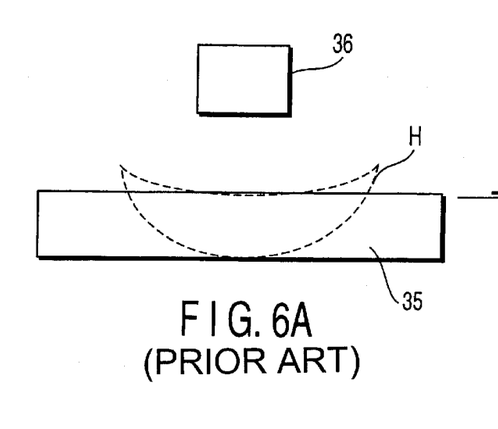
FIG. 6A is a plan view of the conventional magnetic head as viewed from the air-bearing surface.
Figure 6B:
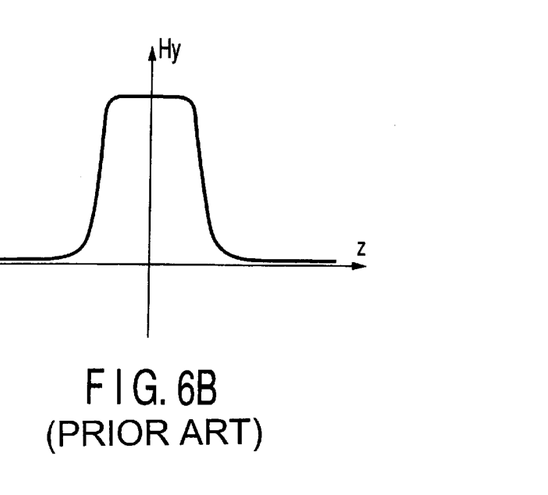
FIG. 6B is a diagram showing recording magnetic field distribution in a track width direction generated by the magnetic head shown in FIG. 6A.

On the other hand, the conventional magnetic head shown in FIGS. 5A and 6A has a structure similar to that of the magnetic head of the present invention except that the gap length between the recording main pole 36 and the auxiliary pole 35 in the air-bearing surface is broad, for example, 3 μm.

Here, recording magnetic field distribution generated by the magnetic heads according to an embodiment of the present invention and the conventional magnetic head will be described. For the on-track recording magnetic field distribution, both in FIGS. 3B and 5B, since the auxiliary pole 35 has a larger area than the recording main pole 36, a magnetic field strength under the auxiliary pole 35 is reduced as compared with the magnetic field strength under the recording main pole 36. However, the magnetic head according to the embodiment of the present invention shown in FIG. 3A has a shorter gap length than the conventional magnetic head shown in FIG. 5A. Therefore, the magnetic field strength under the auxiliary pole 35 is stronger in FIG. 3B than in FIG. 5B. It should be noted that, even when the magnetic field strength under the auxiliary pole 35 is strong on track, no problem occurs.

On the other hand, since the conventional magnetic head shown in FIG. 6A has a long gap length, broadening of a recording magnetic field H in the track width direction is wide. On the contrary, since the magnetic head according to the embodiment of the present invention shown in FIG. 4A has a short gap length, the recording magnetic field is easily concentrated locally around the recording main pole and auxiliary pole, and the broadening of the recording magnetic field in the track width direction is narrow.

When the broadening of the recording magnetic field H in the track width direction is large like in the conventional magnetic head, recorded magnetization in the adjacent tracks is influenced. That is, when recording to a specific track is repeated after recording to the tracks disposed adjacent to the specific track has been performed, the broadening of the recording magnetic field in the track width direction influences the recorded magnetization in the adjacent tracks which reduces reproduction outputs. On the contrary, in the magnetic head according to the embodiment of the present invention, since the broadening of the recording magnetic field in the track width direction is small, the recorded magnetization in the adjacent tracks is not easily influenced.

In order to confirm the aforementioned difference, magnetic heads whose gap lengths are set to 0.18 μm, 0.6 μm, 1 μm and 3 μm, respectively, are fabricated to estimate the influence on the recorded magnetization in the adjacent tracks. Experiments are conducted as follows. Recording is performed with respect to the track disposed adjacent to a specific track, and the reproduction output is measured immediately after the recording of which output value is set to 100. Thereafter, other signals are recorded in the specific track 100 times, and subsequently the reproduction output from the first recorded adjacent track is measured. The obtained reproduction output is normalized by the reproduction output immediately after the recording, and change in the reproduction output is estimated. Such experiments are performed with respect to various combinations of the specific track and the adjacent track, that are different from each other in the guard-band width (=track pitch−recording track width), with varying a track pitch as a total of the recording track width and the guard-band width.

Figure 7:
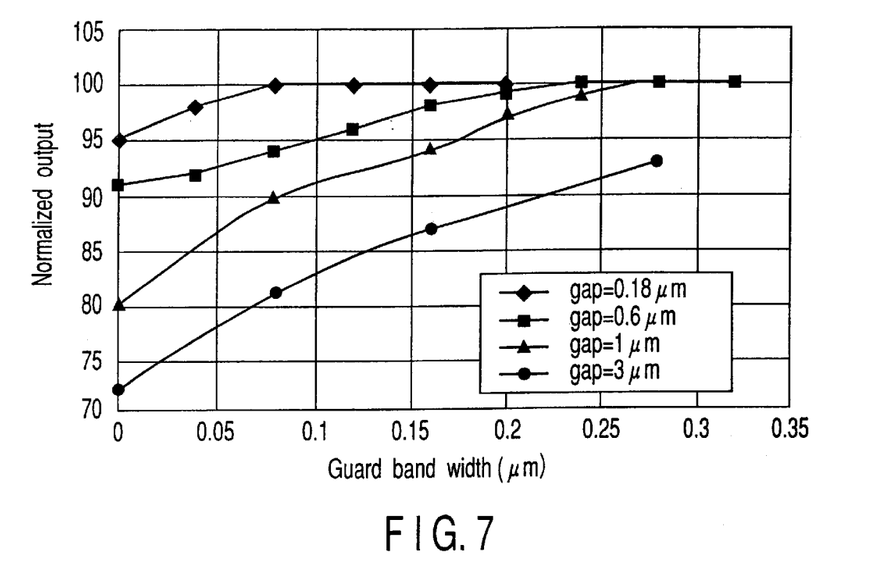
FIG. 7 is a diagram showing a relationship between a guard-band width and a normalized output using a gap length as a parameter when a perpendicular magnetic recording head according to an embodiment of the present invention and a conventional perpendicular magnetic recording head are used.

FIG. 7 shows a relationship between the guard-band width and the normalized output using the gap length as a parameter. Here, from a viewpoint of long-term reliability of the magnetic recording apparatus, a decreasing ratio of the reproduction output is required to be within 5% (i.e., 95% or more of normalized output value). As seen from FIG. 7, in the magnetic head having the gap length of 0.18 μm, 0.6 μm or 1 μm, when the guard-band width is ⅕ or more the gap length, the normalized output of 95% or more can be maintained. That is, when the gap length is set to be five or less times the guard-band width between the recording tracks, the drop of the reproduction output from the adjacent track can be inhibited. On the other hand, when the gap length is as wide as 3 μm as in the conventional magnetic head, the reproduction output from the adjacent track drops to an unacceptable level even with the increased guard-band width.

In high-density recording under a track pitch of 1 μm or less, importance to reduce the guard-band width particularly increases. For example, when the head with a track width or 0.6 μm and a gap length of 1 μm is used as in the aforementioned example, and recording/reproducing is performed with a guard-band width of 0.1 μm and track pitch of 0.7 μm, there is no problem in on-track recording performance. However, it is difficult to secure the long-term reliability of the magnetic recording apparatus.

As described above, in order to secure a high reliability with the perpendicular magnetic recording apparatus operated under a high track density, the gap length between the recording main pole and the auxiliary pole is preferably shortened. More specifically, it is preferable to set the gap length between the recording main pole and the auxiliary pole to be 1 μm or less, and more preferably, to be smaller than 0.2 μm in high-density recording with a track pitch of 1 μm or less. On the other hand, it is preferable to set the gap length to be 30 nm (0.03 μm) or more. If the gap length is shorter than 30 nm, it becomes difficult to form the recording gap and, at the same time, it becomes difficult to allow a recording magnetic field to reach the medium, which brings a result that the recording magnetic field likely forms a closed magnetic path in the magnetic head. The reason is as follows. Here, it is necessary to make the distance between the tip of the recording pole and the medium soft magnetic backing layer shorter than the recording gap length. Since there are a protective layer of the head, a protective layer of the medium and the magnetic recording layer between the tip of the recording pole and the soft magnetic backing layer, however, it is difficult to make the above distance shorter than 30 nm.

Figure 8A:
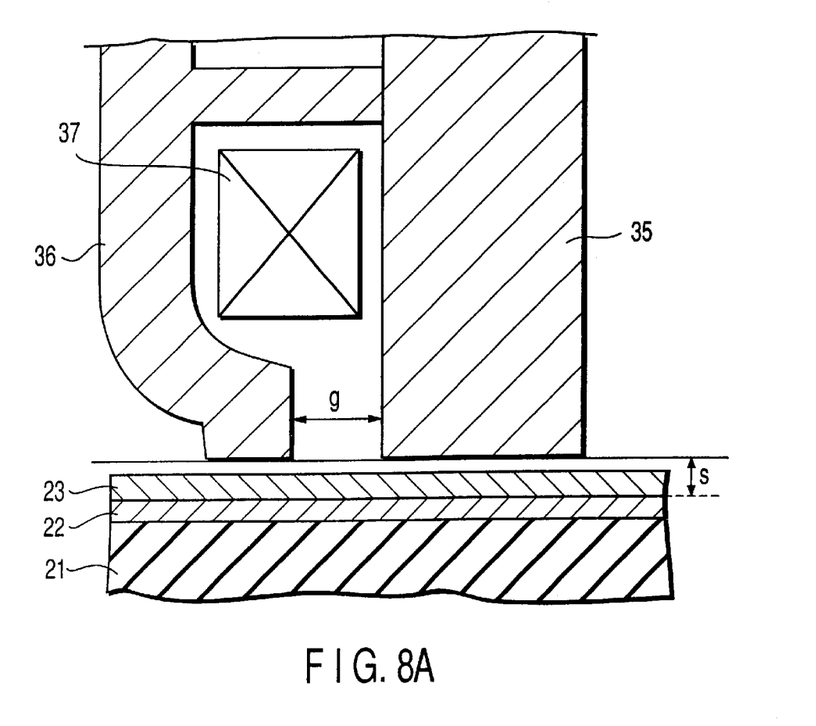
FIG. 8 is a sectional view showing a suitable relationship of a gap length between a recording main pole and an auxiliary pole with a length between a tip end of the recording main pole and the surface of the backing layer during recording in the perpendicular magnetic recording apparatus according to an embodiment of the present invention.
Figure 8B:
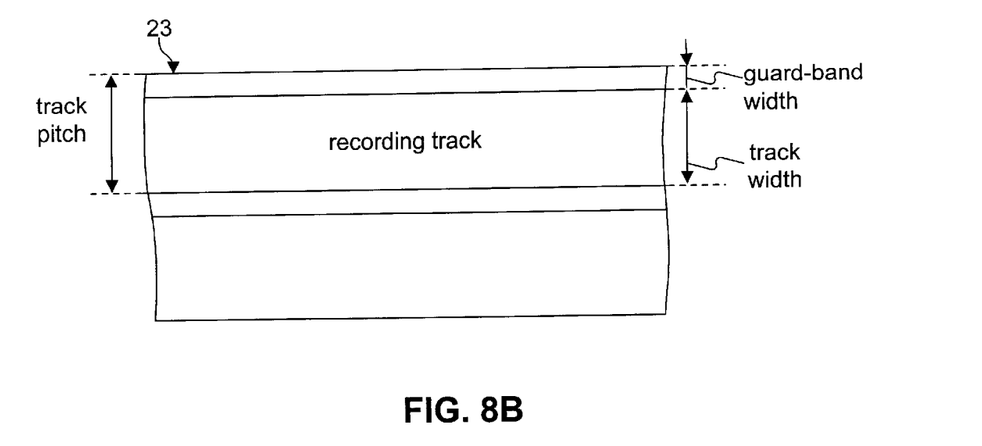

It should be noted that, when interaction between the recording main pole and the auxiliary pole becomes stronger than interaction between the recording main pole and the medium backing layer, a perpendicular component formed in the medium recording layer by the recording magnetic field will be weakened. Therefore, as shown in FIG. 8, where the protective layer and lubricant layer are omitted from the drawing, a gap length g between the recording main pole 36 and the auxiliary pole 35 is preferably set to be longer than a magnetic spacing, that is, a length from the tip end of the recording main pole 36 to the surface of the medium backing layer 22 during recording operation. This constitution enables sufficient on-track recording in the medium.

Hereinbefore, improvement on the recording head to realize a perpendicular magnetic recording apparatus with a high reliability, in which magnetization states in the adjacent tracks can be stabilized, has been mainly described. Additionally, improvement on the perpendicular magnetic recording medium to enhance the reliability of the perpendicular magnetic recording apparatus will be described hereinafter.

Figure 9A:
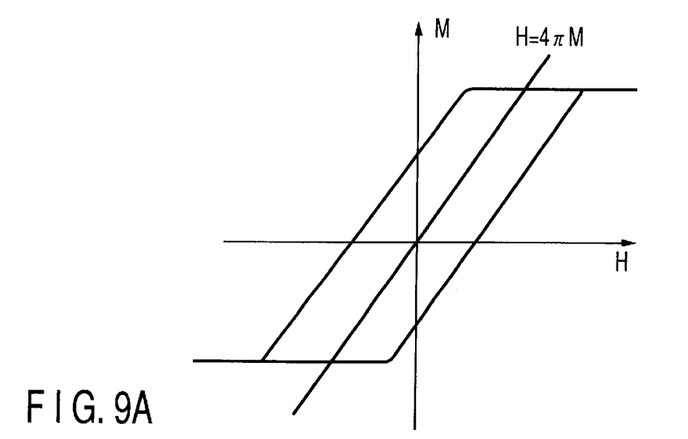
FIGS. 9A and 9B are diagrams showing a magnetization curve in a direction perpendicular to a film surface of two types of recording layers different from each other in a squareness and a nucleation field value for magnetization reversal.
Figure 9B:
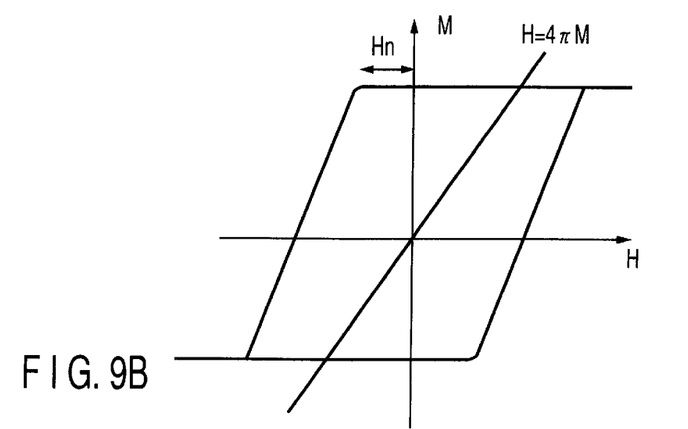

In order to prevent the recorded magnetization in the adjacent tracks from being disturbed by the recording magnetic field broadened in the track width direction under the auxiliary pole of the perpendicular magnetic recording head, it is preferable that a nucleation magnetic field for initiating irreversible magnetization reversal of the medium is high. FIGS. 9A and 9B show magnetization curves in a direction perpendicular to the film surface of two types of recording layers different from each other in a squareness and a nucleation magnetic field value for magnetization reversal. As shown in FIG. 9B, in the recording layer having a high squareness, a position at which the magnetization reversal is initiated appears in the second quadrant of the magnetization curve. An absolute value of the nucleation magnetic field for magnetization reversal is referred to as Hn. In order to prevent the recording magnetization from being attenuated in the adjacent tracks, the strength of Hn may preferably exceed the strength of magnetic field generated in the adjacent tracks under the auxiliary pole.

Usually in the perpendicular magnetic recording layer in which magnetic particles are completely isolated from one another and there is no interaction between them, an MH loop represents an inclination equivalent to that of the line of H=4 πM, as shown in FIG. 9A. In order to secure a high Hn in such perpendicular magnetic recording layer, a relationship between coercive force and saturation magnetization is restricted. On the other hand, when there occurs interaction such as exchange coupling between magnetic particles, the inclination of the MH loop changes. Since the inclination of a tangent of a magnetization curve in the vicinity of the coercive force changes more steeply than that of the line of H=4 πM in such perpendicular magnetic recording layer, a large Hn can be obtained, as shown in FIG. 9B. In this case, there is required little restriction on the coercive force and saturation magnetization in order to obtain the large Hn.

It will be described that the on-track recording characteristics are also enhanced in the recording layer showing the magnetic characteristics as shown in FIG. 9B. In general, when recording is performed on a perpendicular magnetic recording medium with a head having a narrow gap, a reproduction waveform is distorted with increase in a recording current, which easily causes reduction in reproduction output. This phenomenon is called recording demagnetization. This is supposedly attributed to an inclination degree of the recording magnetic field or a flow of recording magnetic field vector. The present inventors have found that use of the recording layer that shows the steeper inclination of the ME loop than that of the line of H=4 πM because of exchange coupling between the magnetic particles and has a high Hn, as shown in FIG. 9B, can suppress the recording demagnetization.

Figure 10:
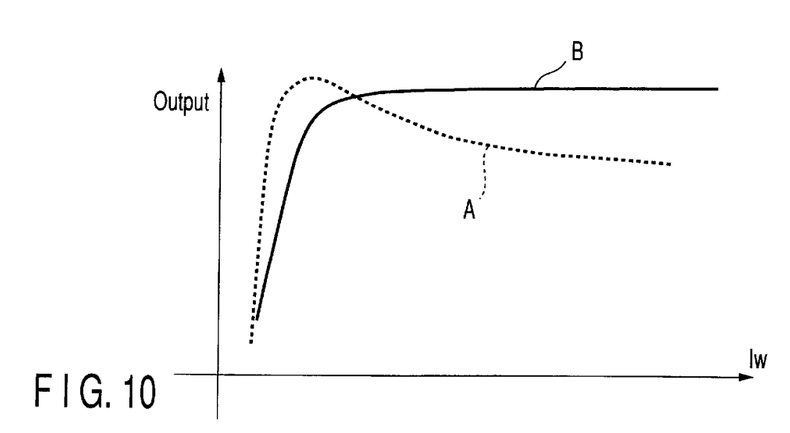
FIG. 10 is a diagram showing input-output characteristics when the magnetic head according to an embodiment of the present invention is used for performing recording with respect to two types of mediums different from each other in the squareness and the nucleation field value for magnetization reversal.

Two types of mediums of a CoCr perpendicular magnetic recording layer (A) having a squareness of 0.75, and a CoPtCrO perpendicular magnetic recording layer (B) having a squareness of 0.98 and Hn=1.6 kOe are prepared. Both the mediums include a soft magnetic backing layer formed of a CoZrNb thin film having a thickness of 300 nm. FIG. 10 shows input/output characteristics when a magnetic head having a gap length of 0.18 μm is used to perform recording with respect to these two types of mediums. In FIG. 10, the output of the CoCr medium (A) decreases with increase in a recording current Iw. On the other hand, it is seen that a constant stable reproduction output can be obtained in a region of a high recording current Iw in the CoPtCrO medium (B).

As described above, when the medium having magnetic characteristics showing the high Hn and the steep MH loop because of exchange coupling between the magnetic particles is used, recording stability of the perpendicular magnetic recording apparatus can further be enhanced even in combination with the perpendicular magnetic recording head having a short gap length.

Moreover, by combination of the perpendicular magnetic recording head having a short gap length according to the present invention with the perpendicular double-layer film medium, overwrite characteristics can advantageously be satisfied even when the backing layer thinner than the conventional backing layer is used. When the conventional recording head having a long gap length is used and the thickness of the soft magnetic backing layer of the medium is set to 300 nm or less, an overwriting SN ratio becomes smaller than 30 dB. On the contrary, use of the recording head having a short gap length according to the present invention can provide satisfactory overwrite characteristics even when the thickness of the backing layer is set to 30 nm.

Figure 11A:
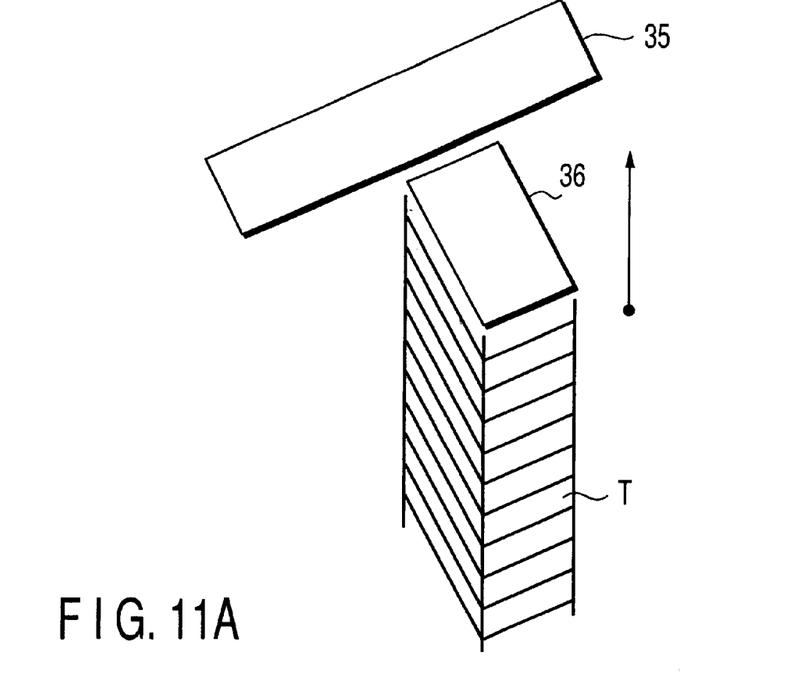
FIGS. 11A and 11B are diagrams showing a state of a recording track on the medium, when the recording main pole is thick or thin in the head traveling direction and the recording head is skewed.
Figure 11B:
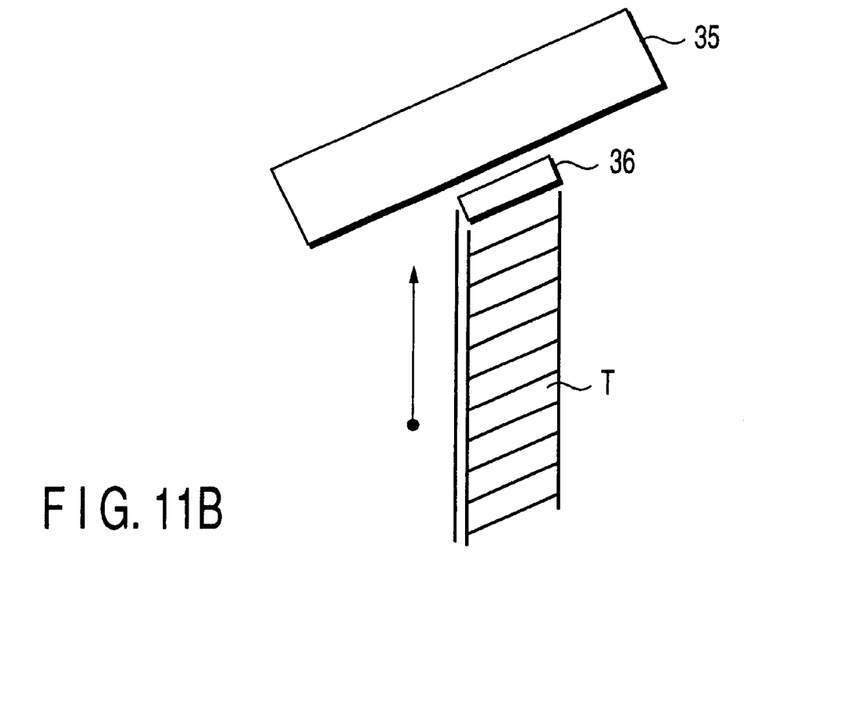

Furthermore, in another embodiment of the present invention, it is preferable to form the recording main pole in an appropriate shape in consideration of a skew angle of the recording head. That is, in the hard-disk type recording apparatus in which the head is operated with a rotary actuator as shown in FIG. 1, the skew angle of the recording head changes depending on a recording radius. In recording to the perpendicular double-layer film medium, a magnetic field generated entirely on a lower surface of the recording main pole opposed to the medium contributes to the recording. FIGS. 11A and 11D show states of the recording track on the medium, when the recording main pole 36 is thick or thin in a head traveling direction and the recording head is skewed. In these drawings, an arrow shows the head traveling direction, and T denotes a recording track. As shown in FIG. 11A, when the recording main pole 36 is thick in the head traveling direction, recording on the medium is performed not only in a recording track to be recorded but also in one side of that track over a remarkably wide range because of the magnetic field generated from a side surface of the recording main pole 36. On the contrary, as shown in FIG. 11B, when the recording main pole 36 is thin in the head traveling direction, the width of a side region recorded in addition to the recording track to be recorded is narrowed. As described above, in another embodiment of the present invention, the recording main pole 36 is preferably thin in the head traveling direction on the air-bearing surface. Particularly, if the thickness of the recording main pole 36 in the head traveling direction on the air-bearing surface is smaller than the magnetic pole track width, change in the recording track width can be suppressed even if the skew angle is generated.

Figure 12:
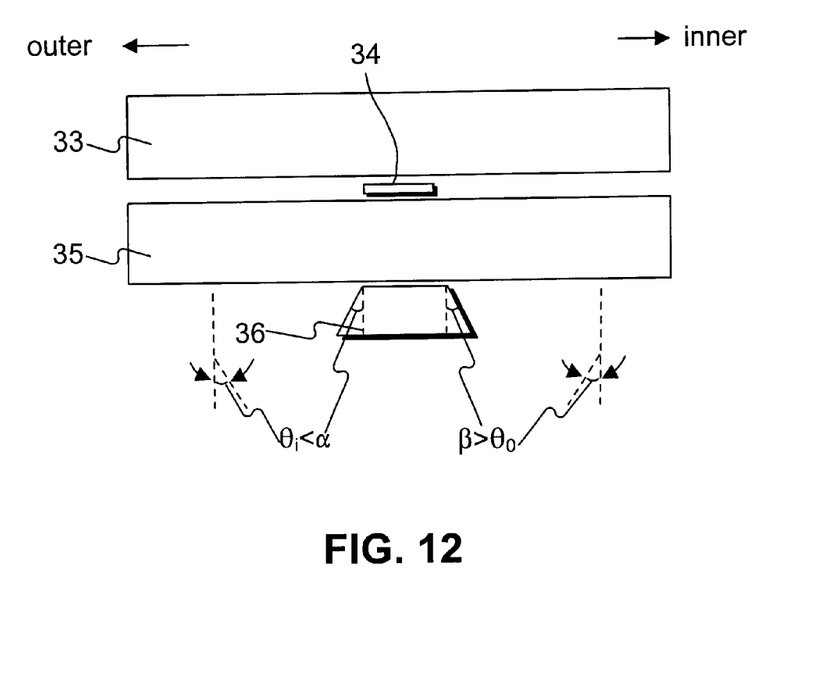
FIG. 12 is a diagram of a magnetic head having a recording main pole with a suitable shape as viewed from the air-bearing surface according to an embodiment of the present invention.

Furthermore, as shown in FIG. 12, the recording main pole 36 is preferably formed in a trapezoidal shape in which the trailing length is longer than the leading length on the air-bearing surface. In this structure, the inclination angle of the side surface of the recording main pole 36 on the outer side of the disk can be set to be larger than a skew angle on the innermost of the disk. Moreover, the inclination angle of the side surface of the recording main pole 36 on the inner side of the disk can be set to be larger than the skew angle on the outermost of the disk. If the side surfaces of the recording main pole 36 are processed in such a manner that the inclination angles of the side surfaces are larger not less than the skew angles on the innermost or outermost of the disk, the change in recording track width can be suppressed even is the skew angle is generated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording head, which is used with a perpendicular double-layer film medium having a stacked structure of a soft magnetic backing layer and a perpendicular magnetic recording layer, performing magnetic recording under a condition that a recording track pitch as a total of a recording track width and a guard-band width between recording tracks is set to be 1 µm or less, the head comprising:

a recording main pole; an auxiliary pole disposed at a gap from the recording main pole; and an exciting coil, a gap length between the recording main pole and the auxiliary pole being five or less times the guard-band width between the recording tracks.

2. The head according to claim 1, wherein the gap length between the recording main pole and the auxiliary pole is 1 µm or less.

3. The head according to claim 2, wherein the gap length between the recording main pole and the auxiliary pole is smaller than 0.2 µm.

4. The head auxiliary according to claim 1, wherein the pole is used as one of a pair of shields sandwiching a reproduce element.

5. The head according to claim 1, wherein a thickness of the recording main pole along a traveling direction is smaller than a width of the recording main pole along a track width direction on an air-bearing surface.

6. The head according to claim 1, wherein the recording main pole is formed in a trapezoidal shape in which a trailing length is longer than a leading length on an air-bearing surface, and wherein an inclination angle of a side surface of the recording main pole on an outer side of a medium is larger than a skew angle on an innermost of the medium, and an inclination angle of the side surface of the recording main pole on an inner side of the medium is larger than a skew angle on an outermost of the medium.

7. A perpendicular magnetic recording apparatus comprising:

a perpendicular double-layer film medium having a stacked structure of a soft magnetic backing layer and a perpendicular magnetic recording layer in which magnetic recording is performed under a condition that a recording track pitch as a total of a recording track width and a guard-band width between recording tracks is set to be 1 µm or less; and a perpendicular magnetic recording head comprising a recording main pole, an auxiliary pole disposed at a gap having a length of five or less times the guard-band width with respect to the recording main pole, and an exciting coil.

8. The apparatus according to claim 7, wherein the gap length between the recording main pole and the auxiliary pole is 1 µm or less.

9. The apparatus according to claim 8, wherein the gap length between the recording main pole and the auxiliary pole is smaller than 0.2 µm.

10. The apparatus according to claim 7, wherein the auxiliary pole is used as one of a pair of shields sandwiching a reproduce element.

11. The apparatus according to claim 7, wherein a distance between a tip end of the recording main pole and a surface of the soft magnetic backing layer of the perpendicular double-layer film medium during recording operation is shorter than a gap length between the recording main pole and the auxiliary pole.

12. The apparatus according to claim 7, wherein the perpendicular magnetic recording layer of the perpendicular double-layer film medium represents a magnetization curve in a perpendicular direction that a position at which irreversible magnetization reversal is initiated appears in a second quadrant.

13. The apparatus according to claim 12, wherein the perpendicular magnetic recording layer of the perpendicular double-layer film medium represents a magnetization curve in a perpendicular direction that an inclination of a tangent of the magnetization curve in the vicinity of a coercive force is steeper than that of a line of H=4 πM.

14. The apparatus according to claim 7, wherein a thickness of the recording main pole along a traveling direction is smaller than a width of the recording main pole along a track width direction on an air-bearing surface.

15. The apparatus according to claim 7, wherein the recording main pole is formed in a trapezoidal shape in which a trailing length is longer than a leading length on an air-bearing surface, and wherein an inclination angle of a side surface of the recording main pole on an outer side of a medium is larger than a skew angle on an innermost of the medium, and an inclination angle of the side surface of the recording main pole on an inner side of the medium is larger than a skew angle on an outermost of the medium.

* * * * *

UNITED STATES PATENT AND TRADEMARK OFFICE
CERTIFICATE OF CORRECTION

PATENT NO. : 6,707,643 B2  Page 1 of 1
DATED : March 16, 2004
INVENTOR(S) : Takeo et al.

It is certified that error appears in the above-identified patent and that said Letters Patent is hereby corrected as shown below:

<u>Column 9,</u>
Line 26, change "head auxiliary according" to -- head according --.
Lines 26-27, change "the pole" to -- the auxiliary pole --.

Signed and Sealed this

Twenty-fifth Day of May, 2004

JON W. DUDAS
*Acting Director of the United States Patent and Trademark Office*